March 30, 1965  F. F. FRANKS  3,175,476
LOCKING BAR FOR AUXILIARY LANDING MAT
Filed April 29, 1963  2 Sheets-Sheet 2
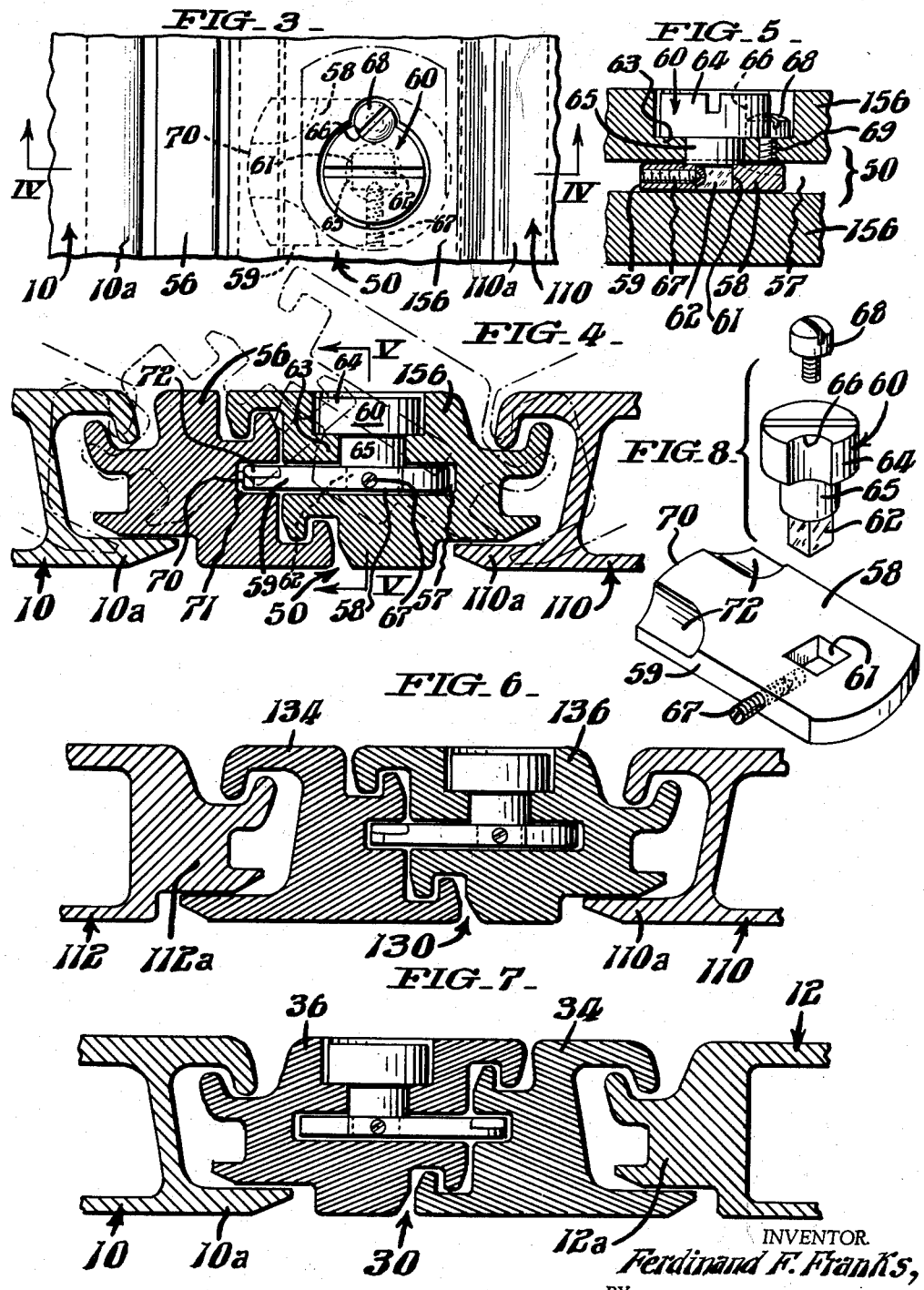

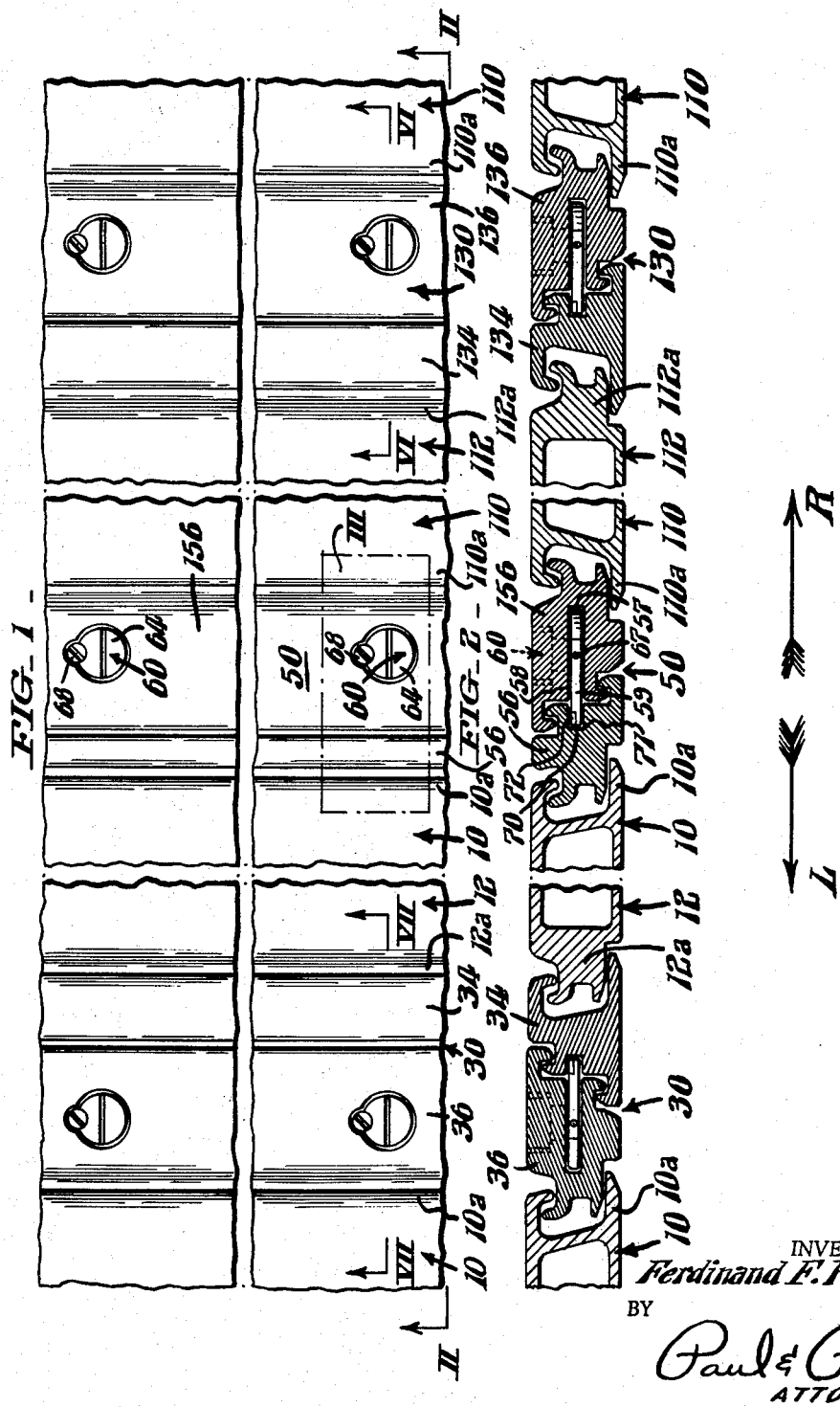

United States Patent Office 3,175,476
Patented Mar. 30, 1965

3,175,476
LOCKING BAR FOR AUXILIARY LANDING MAT
Ferdinand F. Franks, Cheltenham, Pa., assignor to Fenestra Incorporated, Chicago, Ill., a corporation of Michigan
Filed Apr. 29, 1963, Ser. No. 276,390
2 Claims. (Cl. 94—13)

This invention relates to auxiliary landing mats of the type used as temporary landing fields for tactical military aircraft. The mats may also be used as a military roadway, or as a missile pad, or for other temporary purposes, principally military.

In a typical case, a temporary landing field for tactical military aircraft may be 72 feet wide and 2,000 feet long, and may be formed out of about 6,000 structural units, preferably aluminum, each about 2 inches high, two feet wide, and most of them 12 feet long. (In order to stagger the pattern, some of the units are only 6 feet long.) The longitudinal edges of each unit are designed to interlock with a longitudinal mating edge of an adjoining unit. The edge designs are ordinarily such that in laying down the units to form the landing mat field, it has been customary to lay in one direction only, starting at one end and laying toward the other. This was done because it is considerably easier to hook what may be called the female edge onto the male edge than it is to hook the male edge onto the female.

After the temporary landing field has been laid and has been in use, a small portion of the field may become damaged, as not infrequently happens. In such case, the damaged units could not heretofore be removed for replacement or repair without first removing a large number of undamaged units, since it was necessary to start at an edge of the field and work in toward the injured units. It will be seen that, depending upon the location of the damaged units, a very large number of uninjured units may heretofore have had to be taken up before reaching the damaged area.

An important object of the present invention is to provide means whereby the number of units necessary to be taken up to reach the damaged area is very substantially reduced.

Another object is to provide means whereby the landing mat may be laid starting at the center and working concurrently in both directions, thereby making it possible to reduce the time required for laying the field.

These and other objects are accomplished by providing locking bar units at spaced intervals throughout the mat. The locking bar units are readily removed, and when removed, permit the mat units to be taken up starting at that point. The locking bar unit is a two-piece or split structure secured together by suitable latching means. The locking bar units are, in a typical case, either 12 feet or 6 feet long, to match the length of the mat units. To reach, for example, a damaged mat unit for removal, it is merely necessary to unlatch the nearest locking bar unit, remove it, and then start removing mat units until the damaged area is reached.

The mat units and the locking bar units are so laid that their long dimension is parallel with the short dimension of the landing field. That is to say, they are laid across the width of the field. It will be seen that by providing such locking bar units at suitably spaced intervals, say every 50 feet (the length of the field may, in a typical case, be 2,000 feet), the maximum number of mat units necessary to be removed to reach a damaged mat unit is greatly reduced. Assuming a worse condition, namely, that the damaged unit is half-way between adjacent locking bar units, then if the locking bar units are at 50-foot spacings, it will be seen that only twelve two-foot wide mat units will have to be removed to reach the damaged center unit.

The present invention will become clear from the following detailed description of a preferred embodiment selected for illustration in the drawing, in which:

FIG. 1 is a plan view broken to omit most of the structural mat units which are located between the locking bar units;

FIG. 2 is an elevational view, in section, taken along the line II—II of FIG. 1;

FIG. 3 is a detailed plan view of the area shown in dot-and-dash rectangle III in FIG. 1;

FIG. 4 is an elevational view, in section, along the line IV—IV of FIG. 3, showing the latching means;

FIG. 5 is an elevational view, in section, along the line V—V of FIG. 4, showing further details of the latching means;

FIG. 6 is an elevational view, in section, along the line VI—VI of FIG. 1;

FIG. 7 is an elevational view, in section, along the line VII—VII of FIG. 1; and FIG. 8 is an exploded view of the latching mechanism.

In describing the preferred embodiments of the invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

In a typical case, the individual structural mat units are formed of a plurality of narrow extruded aluminum pieces welded together along their long edges to form a mat unit having a height of about two inches, a width of about two feet, and a length of 12 feet. The upper plate of the mat unit is supported by ribs or webs disposed vertically, and/or diagonally vertically, at spaced intervals. The ribs or webs extend longitudinally forming a tubular or cellular type of structural unit. Since the present invention is concerned only with the longitudinal edge portions of the individual mat unit, no effort has been made in the drawing to illustrate the interior structure of the mat units, nor their short cross ends.

Referring now to FIGS. 1 and 2, the reference numeral 10a indicates the right edge portion or a mat unit 10, while the reference numeral 12a indicates the left edge portion of another but similar mat unit 12. Located between mat units 10 and 12, there will ordinarily be, assuming 50-foot spacings between locking bar units, about 22 or so additional similar mat units, each of which has a right edge identical to that shown for unit 10 and a left edge identical to that shown for unit 12.

In FIGS. 1 and 2, it may be assumed that the reference numeral 50 identifies a center type of locking bar unit, which would be laid first, across the width of the landing field at the center line, and that reference numerals 30 and 130 identify the side type by locking bar units which are laid at 50-foot spacings on either side of center. In a typical case, the width of a field may be 72 feet, and the center locking bar unit 50 and the side type of locking bar units 30 and 130 would be laid in 12-foot and 6-foot sections to cover the full width of the field.

Each of the locking bar units 50, 30, and 130 comprises two pieces which are locked together by latching means hereafter to be described. Each of the pieces of the locking bar units has an outer edge configuration identical to either the male or female edge configurations of the structural mat units 12 and 10. The inner edges of the pieces which form the locking bar units 50, 30, and 130 are mating and interlocking, as shown in the drawing.

The auxiliary landing field would be laid by laying first the center latching bar unit 50 and then laying mat units, and at spaced intervals side locking bar units, working to the left and to the right in the directions indicated by the arrows L and R. These directions represent the easy directions in which to lay the field, since the female edge portion, shown for unit 10, is more easily hooked onto the male edge portion, shown for unit 12. It is somewhat more difficult to hook the male edge portion into the female edge portion. It will be seen that, with one unit flat on the ground with the male edge exposed, the female edge of the next unit may be pivotally hooked onto the male edge, using a counterclockwise pivotal motion in laying to the left of center, and a clockwise pivotal motion in laying to the right of center, as viewed in FIGS. 1 and 2.

It will be understood that the mat units and the locking bar units located to the left of the center locking bar unit in FIGS. 1 and 2 are identical to those located to the right of center. To clarify this point, assume that the long dimension of the auxiliary landing field runs east and west, and that the structural mat units and the locking bar units run north and south. In that case, the latching bar unit 30, as viewed in FIG. 2 in cross section from the south, is seen to be identical to that of the latching bar unit 130, if viewed in cross section from the north.

Attention will now be directed to the locking bar units themselves. The left side latching bar units 30 are shown to comprise two pieces 34 and 36, having interior mating interlocking edges. The exterior edge portion of piece 34 is seen to be identical to that of the female edge portion of the mat unit 10, while the exterior edge portion of the latching bar piece 36 is identical to that of male edge portion of the mat unit 12. The overall width of the two pieces 34 and 36, when in interlocked relationship is about four inches.

The right-hand latching bar units 130 are identical in structure to the left-side units 30, and comprise the two interlocking pieces 134 and 136, latched together by means to be described. The exterior edge portion of the latching bar piece 134 is identical to the female edge portion of the structural unit 110, and the exterior edge portion of the locking bar piece 136 is identical to that of the male edge portion of the structural unit 112. Like unit 30, the overall width of the latching bar unit 130, when interlocked, is of the order of four inches. The lengths of the locking bar units 30 and 130 match that of the mat units, most, for example, being 12 feet long with some 6 feet long.

The means by which the two pieces of the latching bar units are latched together will now be described. The latching means for the two pieces of the center locking bar unit 50 is identical to that of the latching means for the side units 30 and 130. The only difference between the center locking bar unit 50 and the side locking bar units 30, 130 is that both pieces of the center unit have similar exterior edges (both being male in the illustrated example, as is preferable for reasons previously indicated) whereas one piece of the side locking bar unit has a male edge while the other has a female edge.

Referring now to FIGS. 3–8, it will be seen that the interlocking interior edges of the pieces of the two-piece locking bar units are so designed that when the latching mechanism is unlatched, as will be described, the one piece, for example, piece 156 of center unit 50 may be removed by merely pivoting the piece 156 in a clockwise direction as viewed in FIGS. 2 and 4. The piece 156 then assumes the position indicated by the dot-and-dash lines in FIG. 4, and may be readily lifted out. The other piece 56 may then be removed by pivoting it counterclockwise, as viewed in FIGS. 2 and 4. The piece 56 then assumes the position indicated by the dot-and-dash lines in FIG. 4, and may be readily lifted out. In this manner, the center locking bar unit 50 is removed, and when removed, a four-inch separation is provided between the mat pieces 10 and 110 of FIG. 2. These mat pieces may then be removed. Assuming, for this discussion that parts 110a and 112a are parts of the same mat unit, this unit is then removed by moving it pivotally in a clockwise direction, as viewed in FIG. 2. Similarly, assuming parts 10a and 12a are parts of the same unit, this unit is removed by moving it in a counterclockwise direction, as viewed in FIG. 2. This action would be continued to remove mat unit after mat unit until the injured unit is reached.

As has already been indicated, to reduce the number of mat units which have to be removed to reach an injured unit, the present invention provides side locking bar units at convenient spacings. The pieces of the side locking bar units 30 and 130 are identical to those of the center unit 50 insofar as the inner interlocking edges are concerned. The latching means, to be described, are also similar. The only difference, as has already been indicated, between the side locking bar units 30, 130 and the center unit 50 is with respect to the contour of one of the outer edges.

With respect now to the latching mechanisms, each of the pieces 36, 136, and 156 is provided, at spaced locations along the length of the piece, with a cavity for receiving the bolt portion of the latching mechanism. Similarly, the mating pieces 34, 134, and 56 are provided at corresponding spaced locations with a recess or socket for receiving the latch bolt, as will be described.

Since each of the locking bar units 30, 50, and 130 is provided with a plurality of identical latching mechanisms at spaced locations, and since the latching mechanisms of each of the locking bar units is identical to those of the others, it will be necessary to describe in detail only one of the latching mechanisms.

Referring now to FIGS. 3, 4, 5, and 8, piece 156 is provided with a horizontal recess 57 located about midway between the upper and lower surfaces of the piece. As seen in the drawing, recess 57 enters at the interior or mating edge of the piece 156 and extends horizontally into the piece, terminating short of the exterior or male edge. Recess 57 has a length somewhat greater than the long dimension of the latch bar 58 so that the latch bar 58 may be inserted therein with its long edge 59 facing the open side of the recess. This long edge 59 is provided with a tapped hole for receiving the set screw 67. The latch bar 58 is provided with a square well 61 for receiving the square shank 62 of the turn key 60. Key 60 has a slotted cylindrical head 64, a cylindrical intermediate shank 65, and a lower square shank 62, as already mentioned. The head 64 has an arcuate recess 66 in its periphery for receiving the lock screw 68.

The piece 156 is bored vertically to provide communication to the latch bar 58 from the upper surface of the piece. As seen in the drawing, the piece 156 has a larger diameter upper vertical bore and a reduced diameter lower vertical bore, forming therebetween a shoulder 63 for receiving the undersurface of the head 64, thereby supporting the key 60 in such a position that when attached to the latch bar 58, the latch bar is supported above the floor of recess 57. The square shank 62 of key 60 is fitted snugly into the square recess 61, and with the latch bar 58 turned lengthwise in the recess 57 so that the edge 59 is exposed, the set screw 67 is tightened against the shank 62. The lock screw 68 may then be inserted in the tapped hole 69 provided in the floor of the shoulder 63 to lock the key 60 in the unlatched position.

To latch the two pieces 56 and 156 together, the lock screw 68 is removed, and using a suitable tool, the key 60 is turned in a counterclockwise direction, as viewed in FIG. 3, to rotate the latch bar 58 from the dot-and-dash position shown in FIG. 3 to the dashed-line position shown in FIG. 3 in which the end 70 of the latch bar 58 enters into the socket 71 provided in the inner edge of piece 56. The lock screw 68 is then reinserted to lock the key 60 and the latch bar 58 in the position in which the two pieces 56 and 156 of the locking bar unit 50 are securely latched together.

To facilitate entry of the latch bar 58 into the socket 71, and into the recess 57, the edge 70 of the latch bar is beveled, as at 72.

As previously indicated, the latching mechanisms of the side locking bar units 130 and 30, shown in FIGS. 6 and 7, respectively, are identical to that of the center locking bar unit 50 just described. Accordingly, it will be unnecessary to describe further the side locking bar latching mechanisms.

No means are provided for interlocking either end of one locking bar unit with the next adjacent locking bar unit. The locking bar units are adquately secured by the latching mechanisms to the mat units, and the mat units are locked at their ends, as well as at their edges, to the adjoining mat units. It is not believed to be necessary, in the present application, to illustrate and describe the means employed to lock the end of one mat unit to the end of the next adjacent mat unit, since the present invention is not concerned therewith. Such end locking means are, however, shown and described in the copending patent application of John Doering and Julian B. Finkel, Serial No. 167,350, filed January 19, 1962, entitled "Interlocking Structural Unit," assigned to the assignee of the present application.

While the preferred embodiments of this invention have been described in some detail, it will be obvious to one skilled in the art that various modifications may be made without departing from the invention as hereinafter claimed.

Having described my invention, I claim:

1. In a structural mat assembly adapted for use as an auxiliary landing field for aircraft in which said structural mat assembly comprises an array of unit mats with locking units interposed at spaced intervals throughout said array, each of said unit mats being relatively long and narrow and having opposed male and female longitudinal edges interlocked with mating edges of adjoining unit mats, locking units each comprising two elongated members mated together and interposed between opposed longitudinal edges of otherwise adjacent unit mats, the opposed outer edges of the mated locking members mating and interlocking with the opposed edges of said otherwise adjacent unit mats, the inner mated edges of each of said locking members having recesses open vertically and vertical projections, the vertical projections of one of said locking members being adapted to be received by the recesses of the other of the locking members forming an interlocking connection which opposes separation of the mated locking members by lateral force but which allows one of the mated locking members to be removed from the other by upward pivotal action unless latched, and means for latching the mated locking members against upward pivotal action, said latching means comprising a plurality of latch bars pivotal horizontally in side-slotted wells provided at spaced locations along the mating edge of one of said mated locking members, the mating edge of the other of said locking members being provided with a plurality of side slots at corresponding locations for receiving said latch bars.

2. In the combination claimed in claim 1, a plurality of turnkeys, one in each of said wells, said turnkeys having their lower end portions connected to the latch bars and supporting the latch bars for pivotal movement through the side slots of said wells and of said other locking member.

References Cited by the Examiner
UNITED STATES PATENTS

| | | | |
|---|---|---|---|
| 1,599,068 | 9/26 | Swope | 151—8 |
| 1,814,858 | 7/31 | Rutter | 151—8 |
| 2,340,864 | 2/44 | Carpenter | 20—92 |
| 2,632,536 | 3/53 | Skeel | 189—34 |

JACOB L. NACKENOFF, *Primary Examiner.*